(12) United States Patent
Jaradi et al.

(10) Patent No.: US 11,541,842 B2
(45) Date of Patent: Jan. 3, 2023

(54) SEATBELT ASSEMBLY INCLUDING PROXIMITY SENSOR AND MARKER

(71) Applicant: Ford Global Technologies, LLC, Dearborn, MI (US)

(72) Inventors: Dean M. Jaradi, Macomb, MI (US); S.M. Iskander Farooq, Novi, MI (US); Mohammad Omar Faruque, Ann Arbor, MI (US); Robert William McCoy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 229 days.

(21) Appl. No.: 17/067,927

(22) Filed: Oct. 12, 2020

(65) Prior Publication Data
US 2022/0111819 A1      Apr. 14, 2022

(51) Int. Cl.
| | | |
|---|---|---|
| *B60R 22/48* | (2006.01) | |
| *B60R 22/34* | (2006.01) | |
| *B60R 22/10* | (2006.01) | |
| *B60R 22/12* | (2006.01) | |

(52) U.S. Cl.
CPC ............ *B60R 22/48* (2013.01); *B60R 22/105* (2013.01); *B60R 22/12* (2013.01); *B60R 22/34* (2013.01); *B60R 2022/4808* (2013.01)

(58) Field of Classification Search
CPC ....... B60R 22/48; B60R 22/105; B60R 22/12; B60R 22/34; B60R 2022/4808; B60R 2022/4816; B60R 2022/4825; B60R 2022/485; B60N 2/002

USPC ....................................................... 280/801.1
See application file for complete search history.

(56) References Cited

U.S. PATENT DOCUMENTS

| | | | |
|---|---|---|---|
| 6,581,960 B1 * | 6/2003 | Schondorf ........ | B60R 21/01546 280/801.1 |
| 6,729,194 B2 | 5/2004 | Kaijala et al. | |
| 7,370,822 B2 * | 5/2008 | Hiramatsu .......... | B60R 22/3413 242/381.1 |
| 9,499,116 B2 * | 11/2016 | Tada .................. | B60R 21/01542 |
| 9,676,356 B2 * | 6/2017 | Ghannam .............. | B60K 28/02 |
| 9,821,761 B2 * | 11/2017 | Le ........................... | B60R 22/48 |
| 10,000,186 B2 * | 6/2018 | Le ........................... | B60R 22/12 |
| 10,150,446 B2 * | 12/2018 | Le ......................... | G01B 3/1003 |
| 10,272,872 B2 * | 4/2019 | Le ...................... | B60R 21/01548 |
| 10,384,639 B2 * | 8/2019 | McCoy ................. | B60R 22/023 |
| 2006/0095184 A1 * | 5/2006 | Gray .................. | B60R 21/01532 280/801.1 |
| 2015/0360643 A1 * | 12/2015 | Cech ...................... | G01V 3/088 297/217.3 |
| 2018/0265033 A1 * | 9/2018 | Jaradi .................... | B60R 22/415 |
| 2018/0312136 A1 * | 11/2018 | Morrow .................... | H04Q 9/00 |

(Continued)

*Primary Examiner* — Paul N Dickson
*Assistant Examiner* — Caitlin Anne Miller
(74) *Attorney, Agent, or Firm* — Frank A. MacKenzie; Bejin Bieneman PLC (57) ABSTRACT

A system includes a seatbelt retractor and a webbing payable from the seatbelt retractor. A marker is fixed to the webbing. A proximity sensor is fixed relative to the seatbelt retractor. The proximity sensor is designed to detect the marker when the marker is within sensing range of the proximity sensor. The marker is positioned along the webbing to be out of sensing range of the proximity sensor when the webbing is engaged with a 6-year-old anthropomorphic test device and to be in sensing range of the proximity sensor when the webbing is engaged with a child seat.

19 Claims, 7 Drawing Sheets

(56) References Cited

U.S. PATENT DOCUMENTS

| | | | |
|---|---|---|---|
| 2018/0361974 A1* | 12/2018 | Le | B60R 21/01544 |
| 2019/0077354 A1* | 3/2019 | O'Connor | B60R 21/0132 |
| 2019/0344741 A1* | 11/2019 | Korona | B60R 21/01512 |
| 2021/0206345 A1* | 7/2021 | Nebuya | G01B 7/28 |
| 2022/0128422 A1* | 4/2022 | Cech | B60W 60/0016 |

* cited by examiner

SEATBELT ASSEMBLY INCLUDING PROXIMITY SENSOR AND MARKER

BACKGROUND

A vehicle seat may support a variety of different sized occupants. As an example, a large occupant, e.g. a $95^{th}$-percentile male sized occupant, may be seated on the seat or a small occupant, e.g., a $5^{th}$-percentile female sized occupant, may be seated on the seat. In addition, a child seat may be supported on and fixed to the seat. The child seat may be forward facing or rearward facing. Competing design factors exist for controlling the kinematics of a large occupant or a small occupant.

DETAILED DESCRIPTION

A vehicle includes a rear seat, a seatbelt retractor; and a webbing payable across the rear seat from the seatbelt retractor. A marker is fixed to the webbing. A proximity sensor is fixed relative to the seatbelt retractor. The proximity sensor is designed to detect the marker when the marker is within sensing range of the proximity sensor. The marker is positioned along the webbing to be out of sensing range of the proximity sensor when the webbing is engaged with a 6-year-old anthropomorphic test device seated on the rear seat and to be in sensing range of the proximity sensor when the webbing is engaged with a child seat on the rear seat.

The system may include a computer having a processor and a memory storing instructions executable by the processor to operate the seatbelt retractor in a high-load mode when the marker is detected by the proximity sensor and to operate the seatbelt retractor in a low-load mode in the absence of detection of the marker by the proximity sensor.

The marker may be positioned along the webbing to be in sensing range of the proximity sensor when the webbing is engaged with a 50th percentile male anthropomorphic test device on the rear seat.

The webbing may be elongated along an axis. The marker may have a first end and a second end on the axis and may be elongated along the axis between the first end and the second end. The first end of the marker may be positioned along the axis to be in sensing range of the proximity sensor when the webbing is engaged with a 50th percentile male anthropomorphic test device on the rear seat and the second end of the marker may be positioned along the axis to be in sensing range of the proximity sensor when the webbing is engaged with a child seat on the rear seat. The webbing may have a first end in the retractor and a second end spaced from the retractor and fixed relative to the rear seat. The second end of the marker may be between the first end of the marker and the second end of the webbing. A portion of the webbing between the first end of the marker and the second end of the webbing may be positioned to be in sensing range of the proximity sensor when the webbing is engaged with a 6-year-old anthropomorphic test device on the rear seat. The second end of the marker may be positioned along the axis to be in sensing range of the proximity sensor when the webbing is engaged with a rear-facing child seat on the rear seat. A portion of the marker between the first end and the second end of the marker may be positioned along the axis to be in sensing range of the proximity sensor when the webbing is engaged with a front-facing child seat on the rear seat The marker may be positioned along the webbing to be out of sensing range of the proximity sensor when the webbing is engaged with a 10-year-old anthropomorphic test device and when the webbing is engaged with a $5^{th}$-percentile female anthropomorphic test device. The marker may be positioned along the webbing to be in sensing range of the proximity sensor when the webbing is engaged with a $50^{th}$-percentile male anthropomorphic test device and when the webbing is engaged with a $95^{th}$-percentile male anthropomorphic test device.

A clip may be slidably engaged with the webbing along the axis. A seatbelt buckle may be fixed relative to the rear seat and releasably engageable with the clip. The clip may be engaged with the seatbelt buckle when the webbing is engaged with a 6-year-old anthropomorphic test device and when the webbing is engaged with a child seat.

The marker may be inside the retractor when the webbing is engaged with a 6-year-old anthropomorphic test device on the rear seat and the marker is outside of the retractor when the webbing is engaged with a child seat on the rear seat.

A system includes a seatbelt retractor, a webbing payable from the seatbelt retractor, and a marker fixed to the webbing. A proximity sensor is fixed relative to the seatbelt retractor. The proximity sensor may be designed to detect the marker when the marker is within sensing range of the proximity sensor. The marker is positioned along the webbing to be out of sensing range of the proximity sensor when the webbing is engaged with a 6-year-old anthropomorphic test device and to be in sensing range of the proximity sensor when the webbing is engaged with a child seat.

The system may include a computer having a processor and a memory storing instructions executable by the processor to operate the seatbelt retractor in a high-load mode when the marker is detected by the proximity sensor and to operate the seatbelt retractor in a low-load mode in the absence of detection of the marker by the proximity sensor.

The marker may be positioned along the webbing to be in sensing range of the proximity sensor when the webbing is engaged with a 50th percentile male anthropomorphic test device.

The webbing may be elongated along an axis. The marker may have a first end and a second end on the axis and may be elongated along the axis between the first end and the second end. The first end of the marker may be positioned along the axis to be in sensing range of the proximity sensor when the webbing is engaged with a $50^{th}$-percentile male anthropomorphic test device and the second end of the marker may be positioned along the axis to be in sensing range of the proximity sensor when the webbing is engaged with a child seat.

The webbing may have a first end in the retractor and a second end spaced from the retractor. The second end of the marker may be between the first end of the marker and the second end of the webbing.

A portion of the webbing between the first end of the marker and the second end of the webbing may be positioned to be in sensing range of the proximity sensor when the webbing is engaged with a 6-year-old anthropomorphic test device.

The second end of the marker may be positioned along the axis to be in sensing range of the proximity sensor when the webbing is engaged with a rear-facing child seat.

A portion of the marker between the first end and the second end of the marker may be positioned along the axis to be in sensing range of the proximity sensor when the webbing is engaged with a front-facing child seat.

A clip may be slidably engaged with the webbing along the axis. A seatbelt buckle may be releasably engageable with the clip. The clip may be engaged with the seatbelt buckle when the webbing is engaged with a 6-year-old anthropomorphic test device and when the webbing is engaged with a child seat.

With reference to the Figures, wherein like numerals indicate like parts throughout the several views, a vehicle 10 is generally shown. The vehicle 10 includes a rear seat 12, a seatbelt retractor 18, and a webbing 14 payable across the rear seat 12 from the seatbelt retractor 18. A marker 20 is fixed to the webbing 14 and a proximity sensor 22 is fixed relative to the seatbelt retractor 18. The proximity sensor 22 is designed to detect the marker 20 when the marker 20 is within sensing range of the proximity sensor 22. The marker 20 is positioned along the webbing 14 to be out of sensing range of the proximity sensor 22 when the webbing 14 is engaged with a 6-year-old anthropomorphic test device (ATD) seated on the rear seat 12. The marker 20 is positioned along the webbing 14 to be in sensing range of the proximity sensor 22 when the webbing 14 is engaged with a child seat 24 on the rear seat 12.

The position of the marker 20 on the webbing 14 allows for distinction between a relatively small occupant of the rear seat 12, e.g., a 6-year-old ATD, and a child seat 24 on the rear seat 12. Specifically, the distinction between a relatively small occupant and a child seat 24 on the rear seat 12 is based on payout of the webbing 14 from the retractor as identified by detection of the marker 20 by the proximity sensor 22. This distinction between a 6-year-old ATD on the rear seat 12 and a child seat 24 on the rear seat 12 may be used to control operation of the seatbelt retractor 18, as described further below. For example, seatbelt retractor 18 may be operated in a low-load mode when the webbing 14 is engaged with a 6-year-old ATD and may be operated in a high-load mode when the webbing 14 is engaged with a child seat 24.

Figure 1:
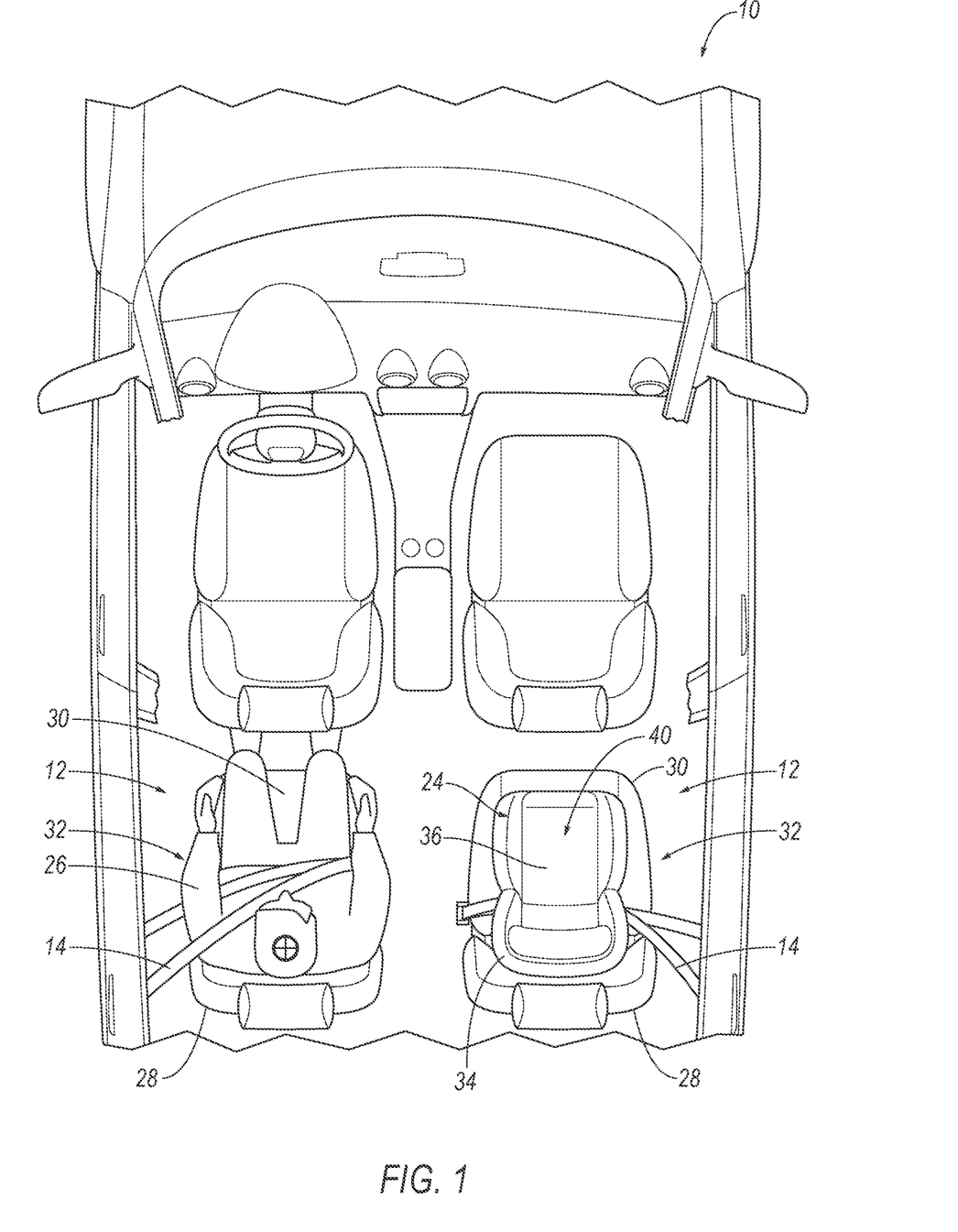
FIG. 1 is a top view of a passenger compartment of a vehicle.

The vehicle 10, as shown in FIG. 1, may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 includes a passenger cabin to house the occupant of the vehicle 10. As shown in FIG. 1, the vehicle 10 includes a plurality of seats. The seats include at least one front seat (not numbered), e.g., two front seats as shown in FIG. 1, disposed at a front of the passenger cabin. The vehicle 10 includes at least one rear seat 12 disposed behind the front seats. In the example shown in FIG. 1, the vehicle 10 includes two rear seats 12. In an example including more than one rear seat 12, the vehicle 10 includes at least one seatbelt retractor 18 and the webbing 14 associated with one of the rear seats 12. In some examples, the vehicle 10 includes more than one seatbelt retractor 18 and webbing 14 each associated with respective rear seats 12. The rear seats 12 may be in a second row of seats, as shown in FIG. 1. As another example, the rear seats 12 may be in a third row of seats. The position and orientation of the seats and components thereof may be adjustable by the occupant. The seats are shown as bucket seats in the figures; the seats, including the rear seats 12, may be of any suitable type or combination of types, e.g., bucket seats, bench seats, etc.

The seat 12 includes the seatback 28 and a seat bottom 30. The seatback 28 may be supported by the seat bottom 30 and may be stationary or movable relative to the seat bottom 30. The seatback 28 and the seat bottom 30 may be adjustable in multiple degrees of freedom. Specifically, the seatback 28 and the seat bottom 30 may themselves be adjustable, in other words, adjustable components within the seatback 28 and/or the seat bottom 30, and/or may be adjustable relative to each other.

The seatback 28 may include a seatback frame (not numbered) and a covering (not numbered) supported on the seatback frame. The seatback frame may include tubes, beams, etc. Specifically, the seatback frame includes a pair of upright frame members. The upright frame members are elongated, and specifically, are elongated in a generally upright direction when the seatback 28 is in a generally upright position. The upright frame members are spaced from each other and the seatback frame includes crossmembers (not shown) extending between the upright frame members. The seatback frame, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame may be formed of a suitable metal, e.g., steel, aluminum, etc.

The seatback 28 defines an occupant seating area 32. The occupant seating area 32 is the area occupied by an occupant when seated on the seat bottom 30. The occupant seating area 32 is in a seat-forward direction of the seatback 28 and above the seat bottom 30. The occupant seating area 32 for the rear seat 12 may be between the front seat and the seatback 28 of the rear seat 12.

As set forth above, an ATD 26 may be seated on the rear seat 12. The ATD 26 simulates a human body in vehicle 10 crash tests. The ATD 26 may be a Hybrid III ATD, as is known, or any suitable type of ATD 26. As is known, the Hybrid III ATD comes in various sizes to represent different segments of a human population, e.g., a 5th-percentile female, a 50th-percentile male, a 95th-percentile male, a 6-year-old, a 10-year-old, etc. FIG. 1, for example, shows a 6-year-old ATD. Specifically, the 5th-percentile female is sized to match the size of a female at the 5th-percentile size of a human population, and so on for the other percentile sizes. The 6-year-old ATD is sized to match the size of a 6-year-old child of a human population, and so on for other age sizes. The stature, weight, and other anthropomorphic measurements of these standard-size ATDs may vary based on geographic location of the human population, different human populations may exist in different geographic locations and ATDs may be sized differently for different populations, e.g., North American population, European population, Asian population, etc., may have different sizes. The stature, weight, and other anthropomorphic measurements of the ATD 26 may be based on definitions of a standards-setting body, e.g., a government agency such as the National Highway Traffic Safety Administration (NHTSA).

The vehicle 10 may include a child seat 24, as shown in the Figures. The child seat 24 may be supported on the rear seat 12 in the occupant seating area 32 and is releasably engaged with the rear seat 12 by the webbing 14, as described further below. The child seat 24 is designed to control the kinematics of a child-occupant during a vehicle impact. The child seat 24 may be of any suitable type. For example, as is known, the child seat 24 may be an infant car seat, a convertible seat, an all-in-one seat, a booster seat with high back, and a backless booster seat. As an example, NHTSA classifies each of these types.

As shown in FIG. 1, the child seat 24 has a child-seat bottom 34 and a child-seat back 36. The child-seat back 36 and the child-seat bottom 34 defines a child-occupant seating area 40. The child-occupant may be disposed in the child-occupant seating area 40, as shown in the figures.

Figure 5:
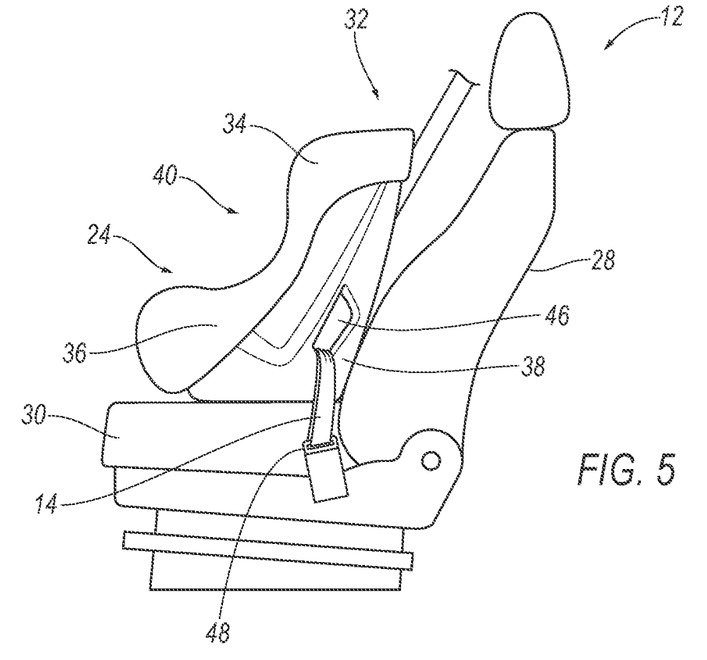
FIG. 5 is a side view of a rear seat and a child seat in a forward-facing position.
Figure 6:
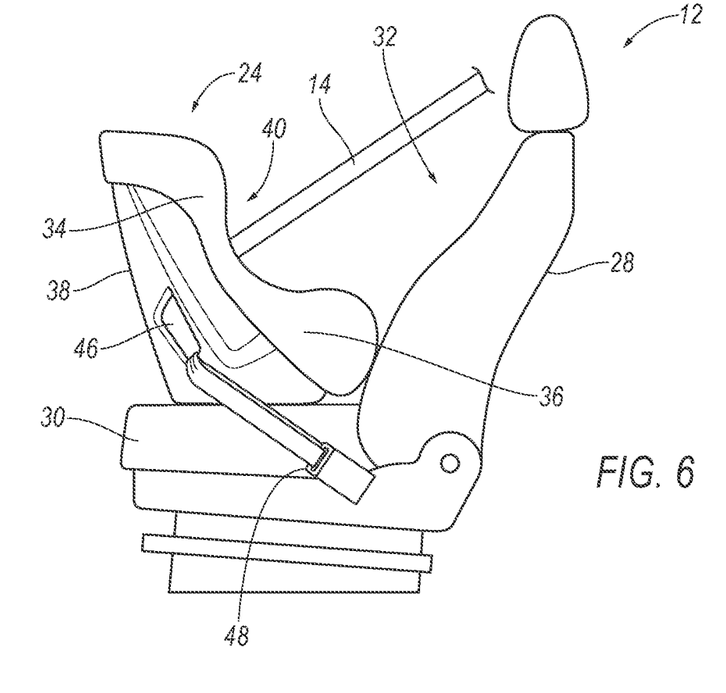
FIG. 6 is a side view of a rear seat and a child seat in a rearward-facing position.

With reference to FIGS. 5 and 6, the child seat 24 may have a shell 38, as shown in FIGS. 5 and 6. The child-seat bottom 34 the child-seat back 36 may be supported by the shell 38. The child seat 24, e.g., the shell 38, is supported on the seat bottom 30. Specifically, the shell 38 is in the occupant seating area 32 of the rear seat 12. The shell 38 may be in contact with the seat bottom 30, the seatback 28, or both.

Figure 7:
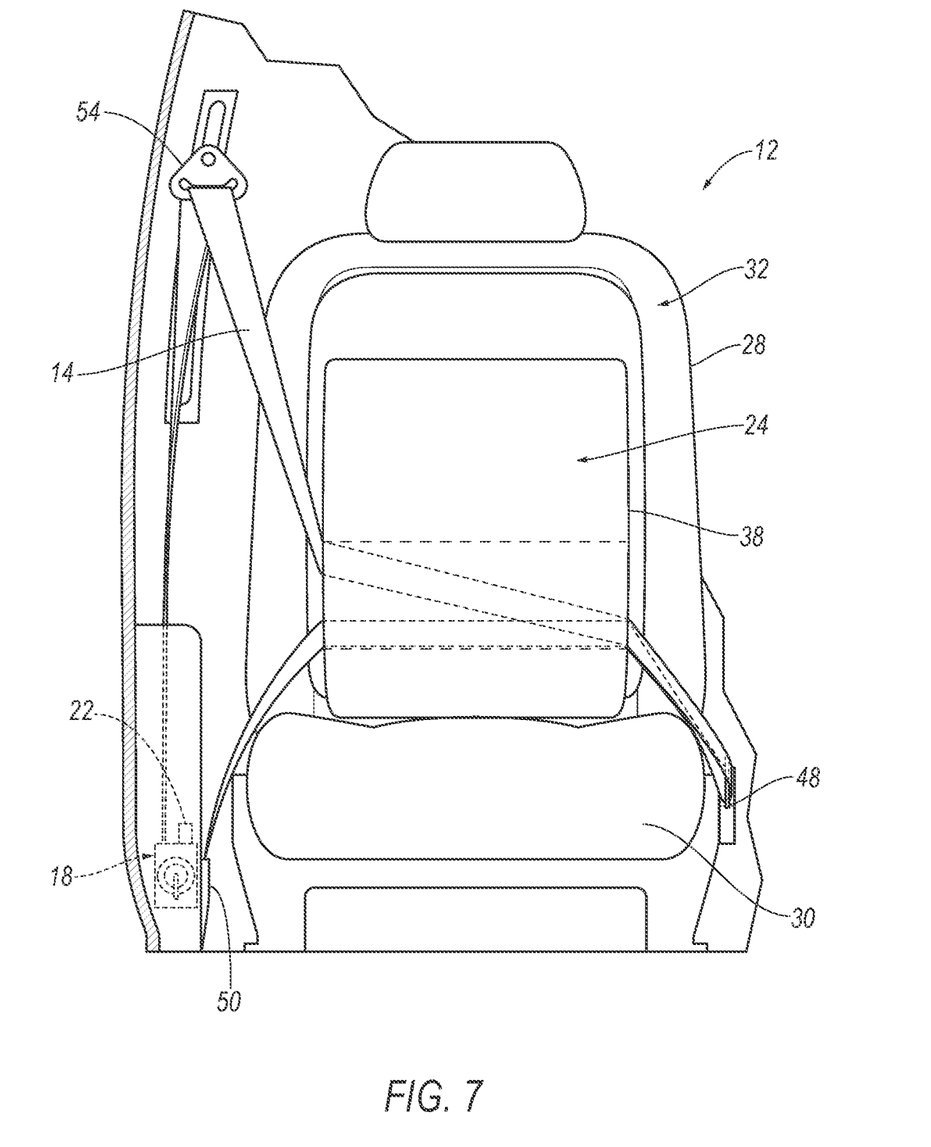
FIG. 7 is a front view of the rear seat with the child seat in the rearward-facing position.

The child seat 24 may include at least one installation component. As shown in the Figures, the installation component may be a webbing passthrough 42. The webbing passthrough 42 may be defined by the shell 38, as shown in the example in FIGS. 5-7. As another example, the installation component may be an anchor 50 system, e.g., Lower Anchor and Tethers for Children (LATCH) systems, the combination of a seatbelt and the LATCH system, etc. The anchor 50 system may be fixed to the seatback frame.

The child seat 24 may be installed to the rear seat 12 in a forward-facing position, as in FIG. 5, or a rearward-facing position, as in FIG. 6. In the forward-facing position, child-seat back 36 is between the child-occupant seating area 40 and the seatback 28 such that an occupant of the child seat 24 faces in a seat-forward direction. In the rear-facing position, the child-occupant seating area 40 is between the child-seat back and the seatback 28 such that the occupant of the child seat 24 faces in a seat-rearward direction.

Figure 4:
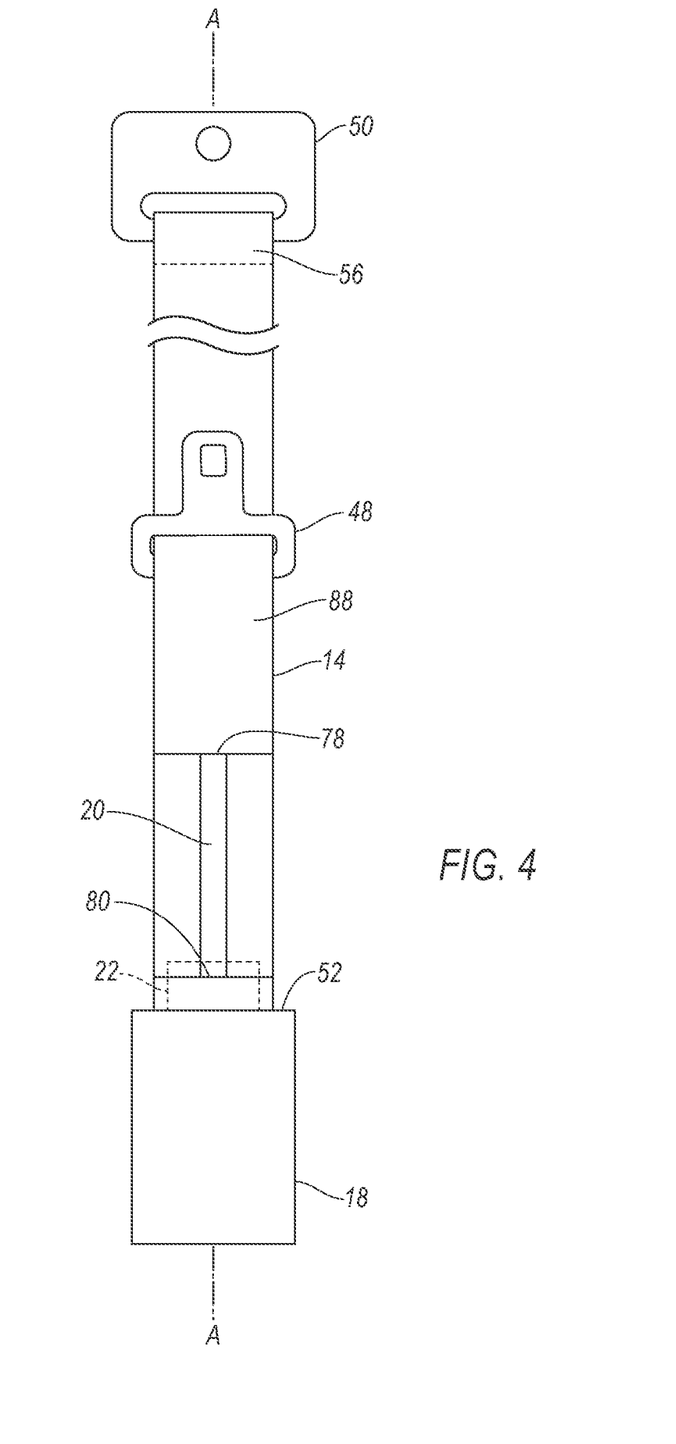
FIG. 4 is a plan view of the seatbelt assembly with the webbing laid flat for illustrative purposes.

With reference to FIG. 4, a seatbelt assembly 44 includes the seatbelt retractor 18 and the webbing 14. The seatbelt assembly 44 may include an anchor 50 on the webbing 14. Specifically, the webbing 14 extends from the seatbelt retractor 18 to the anchor 50. Specifically, one end of the webbing 14 feeds into the seatbelt retractor 18, and the other end of the webbing 14 is fixed to the anchor 50. The webbing 14 may extend continuously from the seatbelt retractor 18 to the anchor 50. The anchor 50 and the seatbelt retractor 18 may be mounted to the rear seat 12 and/or the body of the vehicle 10.

The seatbelt assembly 44 includes a clip 48 slideably engaged with the webbing 14 and a seatbelt buckle 46 mounted to the rear seat 12 and/or the body of the vehicle 10. The seatbelt assembly 44, when fastened, retains the occupant on the seat, e.g., during sudden decelerations of the vehicle 10. Specifically, the webbing 14 is engaged with an occupant, ATD 26, or child seat 24 when the clip 48 is engaged with the seatbelt buckle 46.

The webbing 14 may be fabric, e.g., woven nylon. The clip 48 slides freely along the webbing 14. When the clip 48 is engaged with the seatbelt buckle 46, the clip 48 divides the webbing 14 into a lap band and a shoulder band in the example shown in the Figures. The seatbelt retractor 18 may be moveable from an unlocked position to a locked position by conventional mechanisms known in the art. In the unlocked position, the webbing 14 may be extended from and retracted into the seatbelt retractor 18. In the locked position, the seatbelt retractor 18 prevents extension of the webbing 14 to limit the forward movement of the occupant. The seatbelt retractor 18 may be in the unlocked position by default, i.e., in the absence of a sudden deceleration. The seatbelt retractor 18 may change from the unlocked position to the locked position during a sudden deceleration of the vehicle 10, i.e., deceleration triggers components of the seatbelt retractor 18 to change from the unlocked position to the locked position.

The seatbelt assembly 44 may be a three-point assembly, as shown in the Figures. Specifically, the webbing 14 is anchored at three points when the clip 48 is engaged with the seatbelt buckle 46, i.e., at the anchor 50, the seatbelt retractor 18, and the seatbelt buckle 46. The seatbelt assembly 44 may, alternatively, include another arrangement of attachment points.

The seatbelt assembly 44 may include a guide ring 54 engaged with the webbing 14. For example, the webbing 14 may freely slide through the guide ring 54. Specifically, the webbing 14 may extend from the anchor 50 through the guide ring 54 to the seatbelt retractor 18. The guide ring 54 may be spaced from the seatbelt retractor 18. The guide ring 54 may be fixed to the vehicle 10 body, and/or the rear seat 12.

The webbing 14 has a webbing first end 52 and a webbing second end 56. The webbing first end 52 feeds into the retractor. The seatbelt retractor 18 may include a spool 60 rotatably coupled to the seatbelt retractor 18, and webbing first end 52 may be fixed to the spool 60. Beginning at the webbing first end 52, the webbing 14 may be wound around the spool 60. The webbing second end 56 is spaced from the seatbelt retractor 18. The anchor 50 may attach the webbing second end 56 relative to the vehicle 10 body, e.g., to a vehicle 10 pillar. In other words, the webbing second end 56 be fixed relative to the rear seat 12.

The webbing 14 has a length and is elongated along an axis A. Specifically, the webbing 14, when laid flat, as shown in FIG. 4, the webbing first end 52 and the webbing second end 56 are spaced from each other along the axis A. The clip 48 may be slidably engaged with the webbing 14 along the axis A. When installed in the vehicle 10, the webbing 14 may pass through several components, such as the clip 48 and the guide ring 54, which may change the orientation of the axis. The axis A extends through the first end 52 and the second end 56 and is shown in FIG. 4 when the webbing 14 is laid flat.

Figure 2:
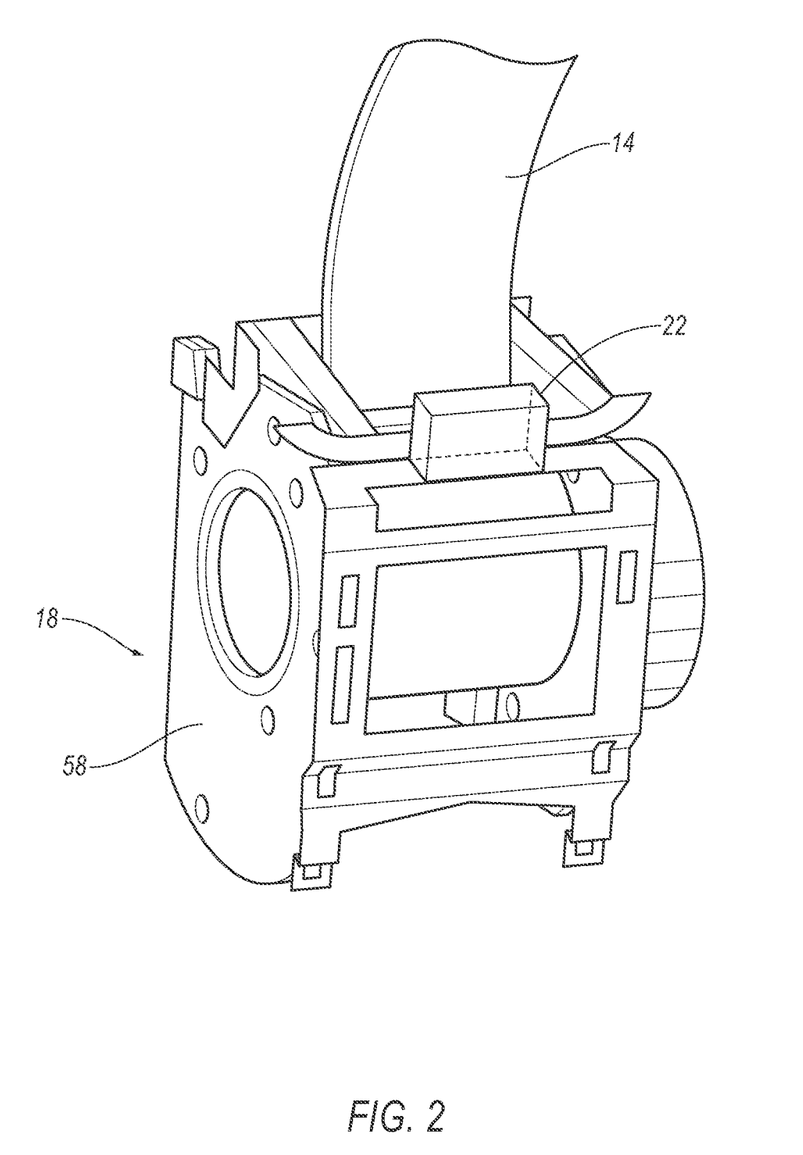
FIG. 2 is a perspective view of a seatbelt assembly.
Figure 3:
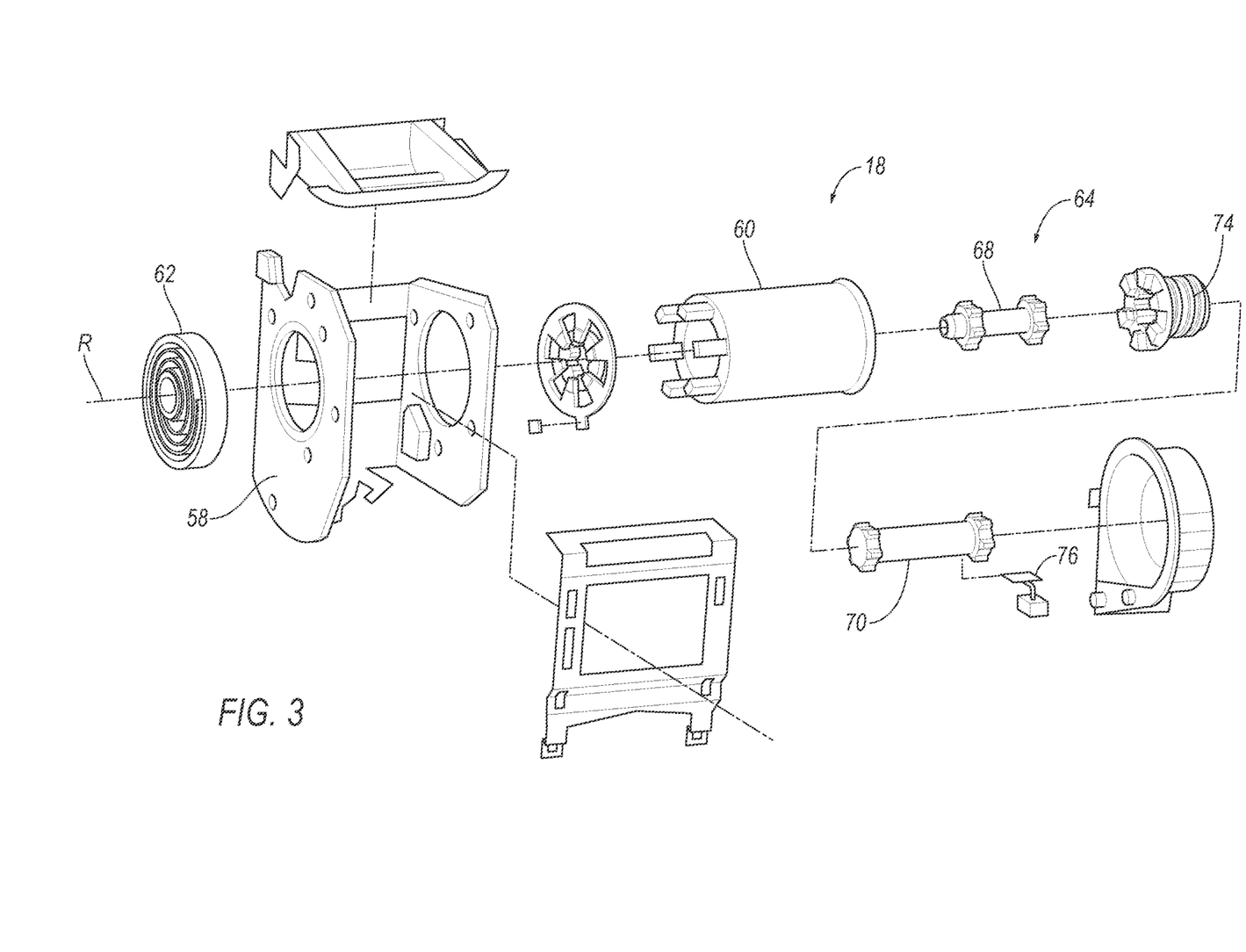
FIG. 3 is an exploded view of a seatbelt retractor of the seatbelt assembly.

As an example, shown in the Figures, the webbing first end 52 is in the retractor. As shown in FIGS. 2 and 3, the seatbelt retractor 18 includes a retractor housing 58. The retractor housing 58 can include a housing body and housing covers attached to the housing body. The retractor housing 58 may be formed of metal or plastic. The retractor housing 58 may be mounted to the body of the vehicle 10 and/or to the rear seat 12.

The seatbelt retractor 18 may include a spool 60 rotatably coupled to the seatbelt retractor 18 housing 58. The spool 60 can freely rotate relative to the retractor housing 58 and is fixed to the retractor housing 58 in all other degrees of freedom. The spool 60 can be cylindrical in shape. The spool 60 defines a rotational axis, about which the spool 60 rotates. The spool 60 extends along the rotational axis R. The webbing first end 52 is fixed to the spool 60 such that the webbing 14 is wound about the spool 60 as the spool 60 rotates relative to the retractor housing 58.

The retractor may include a spring 62, as shown in FIG. 3. The spring 62 is coupled to the spool 60 and to the retractor housing 58. The spring 62 is preloaded to apply a torque to the spool 60 in a retractive direction, i.e., a direction tending to retract the webbing 14. The spring 62 is loaded when the webbing 14 is fully retracted, and the spring 62 is further loaded when the webbing 14 is extracted from the spool 60. Thus, the spring 62 exerts the torque on the spool 60 in the retractive direction. The spring 62 may be a coil spring or any other suitable type.

The seatbelt retractor 18 may be engageable from an unlocked position to a locked position. The seatbelt retractor 18 is in the unlocked position by default, i.e., in the absence of a sudden deceleration. In the unlocked position, the spool 60 is rotatable within the retractor housing to allow the webbing 14 to be extended from and retracted into the seatbelt retractor 18. The seatbelt retractor 18 may change from the unlocked position to the locked position during a sudden deceleration of the vehicle 10, i.e., deceleration triggers components of the seatbelt retractor 18 to change from the unlocked position to the locked position as described further below. For example, the seatbelt retractor 18 16 may change from the unlocked position to the locked position in response to the vehicle impact. In the locked position, the seatbelt retractor 18 exerts a force (not shown) on the webbing 14 opposing webbing 14 payout. In this situation, one end of the spool 60 is rotationally locked relative to the housing, which stops the extension of the webbing 14 from the seatbelt retractor 18 to limit forward movement of the occupant.

The seatbelt retractor 18 may include a load-limiting mechanism 64 that releases a limited amount of additional payout of the webbing 14 when the seatbelt retractor 18 is in the locked position and load on the webbing 14 exceeds a threshold. The load-limiting mechanism 64 is selectively settable between a low-load mode and a high-load mode. When the seatbelt retractor 18 is in a locked position (as described further below), in the low-load mode the load-limiting mechanism 64 allows webbing 14 payout from the seatbelt retractor 18 when a load on the webbing 14 exceeds a low threshold and not before; and in the high-load mode the load-limiting mechanism 64 allows webbing 14 payout from the seatbelt retractor 18 when a load on the webbing 14 exceeds a high threshold (i.e., higher than the low threshold) and not before. The difference in the load limiting between the two modes accommodates occupants of different sizes. A relatively small occupant, such as a 5th-percentile female ATD, a 6-year-old ATD, or a 10-year-old ATD may exert a relatively low force on the retractor (through webbing 14 as discussed below) sufficient to initiate payout of webbing 14 when the retractor is locked and in the low-load mode and insufficient to initiate payout of the webbing 14 when the retractor is locked and in the high-load mode. In contrast, a relatively large occupant, such as a 50th-percentile male ATD or a 95th-percentile male ATD may exert sufficient force on the webbing 14 to initiate payout of the webbing 14 when the retractor is locked and in the high-load mode. The additional extension of the webbing 14 from the retractor during load-limiting payout in the low-load mode and in the high-load mode limits the load applied by the webbing 14 to the chest of a relatively small occupant or a relatively large occupant, respectively, to reduce the chest deflection. Also, a child seat 24 exerts a load on the webbing 14 that is insufficient to initiate payout of the webbing 14 the webbing 14 when the retractor is locked and in the high-load mode.

As one example, with reference to FIG. 3, the load limiting mechanism 64 may, for example, include torsion bar 66. The load-limiting mechanism 64 shown in FIG. 3 is by way of example and the seatbelt retractor 18 may include any suitable type of load-limiting mechanism 64. With reference to FIG. 3, the torsion bar 66 may include a first torsion bar 68, a second torsion bar 70 extending coaxially with the first torsion bar 68, and a shift collar 74 engageable with the first torsion bar 68. As set forth further below, the load limiting mechanism 64 may be operated in the high-load mode or the low-load mode by selectively loading the second torsion bar 70 or the first torsion bar 68, respectively.

The torsion bar 66 may be of the conventional type known in the art. The torsion bar 66 may rotate freely in an unlocked position of the retractor. In a locked position, one end of the torsion bar 66 may be fixed relative to the retractor housing 58 to prevent rotation of the torsion bar 66, i.e., payout of the webbing 14. The torsion bar 66 may be designed to rotationally yield, that is, plastically deform, as the torsion bar 66 is rotated by the webbing 14, i.e., by the force F exerted on the webbing 14 by the occupant. In particular, the torsion bar 66 may be formed of suitable shape, dimension, and material to yield when subjected to a threshold rotational force. For example, when the seatbelt retractor 18 is in the locked position but the webbing 14 exerts a force (not shown) on the seatbelt retractor 18, the torsion bar 66 may prevent the webbing 14 from paying out unless the force by the webbing 14 exceeds a threshold, in which case the rotational yielding may permit the webbing 14 to payout.

The seatbelt retractor 18 may be an emergency locking retractor (ELR). In such an example, the seatbelt retractor includes a locking mechanism movable between an engaged state and a disengaged state. In the engaged state, the locking mechanism locks the second end 56 of the torsion bar 66 to the retractor housing 58, i.e., fixing the second end 56 of the torsion bar 66 relative to the retractor housing 58. In the disengaged state, the locking mechanism permits rotation of the second end 56 of the torsion bar 66 relative to the retractor housing 58. When the locking mechanism is in the disengaged state the torsion bar 66 is rotatable with the spool 60 relative to the retractor housing 58.

With reference to FIG. 3, the seatbelt retractor 18 includes a pawl 76 selectively engageable with one end of the second torsion bar 70, and specifically, the pawl 76 engages the one end of the second torsion bar 70 in the locked position. The spool 60 is engageable with the other end of the second torsion bar 70 in the high-load mode, and is alternatively engageable with the first torsion bar 68 in the low load mode. The second torsion bar 70 absorbs a higher force than the first torsion bar 68, which accounts for the load limiting mechanism 64 to be in the high load mode when the spool 60 is engaged with the second torsion bar 70 and to be in the low load mode when the spool 60 is engaged with the first torsion bar 68.

Specifically, with continued reference to FIG. 3. The pawl 76 is rotatable relative to the housing and a weighted pendulum fixed relative to the pawl 76. When the vehicle 10 is moving at a constant speed, accelerating, or decelerating gradually, the weight of the weighted pendulum causes the pawl 76 to be disengaged with the second torsion bar 70, allowing the spool 60 to rotate relative to the housing, i.e., the seatbelt retractor 18 is in the unlocked position. In this situation, the spool 60 is engaged with the other end of the second torsion bar 70 in the high load mode. When the vehicle 10 suddenly decelerates, the momentum of the weighted pendulum causes the pawl 76 to engage the one end of the second torsion bar 70, i.e., the seatbelt retractor 18 16 is in the locked position, in which the pawl 76 prevents the one end of the second torsion bar 70 from rotating about the axis of rotation A. In this situation, the load limiting mechanism 64 prevents the webbing 14 from rotating the spool 60 unless the webbing 14 exerts a force on the spool 60 exceeding a high load limit Fh, in which case the second torsion bar 70 twists, i.e., deforms to allow payout of the webbing 14. In other words, the load limiting mechanism 64 prevents the force of the seatbelt retractor 18 on the webbing 14, i.e., the force on the occupant by the webbing 14, from exceeding the high load limit Fh when the load limiting mechanism 64 is in the high load mode.

During a vehicle impact, in the low load mode, components of the load limiting mechanism 64 move to engage the spool 60 with the first torsion bar 68 to move the load limiting mechanism 64 to the low load mode. Specifically, with reference to the example in FIG. 3, the shift collar 74 is moved to engage the first torsion bar 68 to transfer the force to the first torsion bar 68. In this situation, the load limiting mechanism 64 prevents the webbing 14 from rotating the spool 60 unless the webbing 14 exerts the force on the spool 60 exceeding a low load limit F1. The first torsion bar 68 twists, i.e., deforms, when the force exceeds the low load limit F1 to allow additional payout of the webbing 14. In other words, the load limiting mechanism 64 prevents the force of the seatbelt retractor 18 on the webbing 14, i.e., the force on the occupant by the webbing 14, from exceeding the low load limit F1 when the load limiting mechanism 64 is in the low load mode, as shown in FIG. 4B. The low load limit F1 is less than the high load limit Fh.

The load limiting mechanism 64 may include a pyrotechnic device 86 in communication with the controller. The pyrotechnic device 86 may release the load limiting mechanism 64 from the high load mode to the low load mode in response to a signal from the sensor indicating the vehicle impact. After the sensor detects a vehicle impact, the controller may, for example, send a signal to the pyrotechnic device 86 to ignite a pyrotechnic charge, which results in the spool 60 engaging the first torsion bar 68. The pyrotechnic device 86 may, for example, ignite the pyrotechnic charge at the predetermined time to release the load limiting mechanism 64 from the high load mode to the low load mode. The pyrotechnic device 86 may be of any suitable pyrotechnic device.

Figure 8:
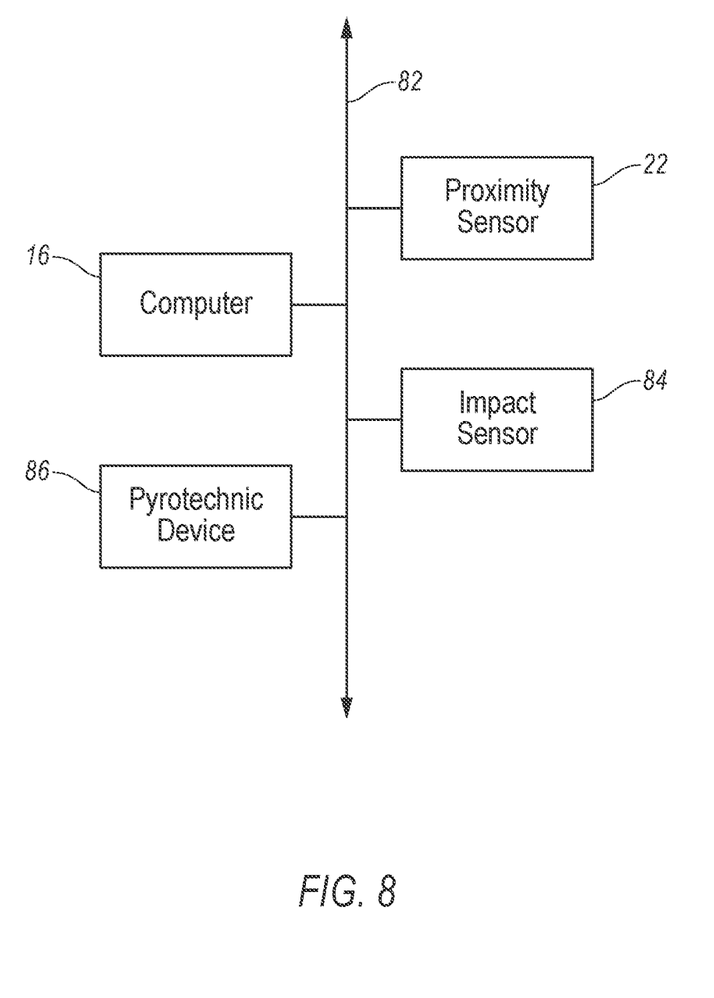
FIG. 8 is a block diagram of a system of the vehicle.

The vehicle 10 includes a computer 16 having a processor and memory storing instructions executable by the processor to control components of the vehicle 10. The memory stores instructions to perform the steps described below. The memory includes one or more forms of computer 16 readable media, and stores instructions executable by the vehicle 10 computer 16 for performing various operations, including as disclosed herein. As in the example described above, the computer 16 may be a restraint control module (RCM). The restraint control module may be in communication with and may control the seatbelt retractor 18, e.g., the torsion bar 66 of the seatbelt retractor 18. The restraint control module may also control airbags, seatbelt pretensioners, etc.

The computer 16 may include or be communicatively coupled to, e.g., via a vehicle 10 network such as a communications bus. The computer 16 is generally arranged for communications on a communication network 82 that can include a bus in the vehicle 10 such as a controller area network (CAN) or the like, and/or other wired and/or wireless mechanisms.

Via the vehicle 10 network, the computer 16 may transmit messages to various devices in the vehicle 10 and/or receive messages (e.g., CAN messages) from the various devices, e.g., sensors, an actuator, a human machine interface (HMI), etc. Alternatively or additionally, in cases where the computer 16 actually comprises a plurality of devices, the communication network 82 be used for communications between devices represented as the computer 16 in this disclosure. Further, as mentioned below, various controllers and/or sensors may provide data to the computer 16 via the communication network 82.

The vehicle 10 may include at least impact sensor 84 in communication with the computer 16. The impact sensor 84 is configured to detect an impact to the vehicle 10. The impact sensor 84 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 84 may be located at numerous points in or on the vehicle 10.

The computer 16, e.g., RCM, stores instructions to control components of the vehicle 10 as described below. Specifically, the instructions include operating the seatbelt retractor 18 in high-load mode when the marker 20 is detected by the proximity sensor 22 and to operate the seatbelt retractor 18 in low-load mode in the absence of detection of the marker 20 by the proximity sensor 22. Specifically, the computer 16 stores instructions to identify detection of the marker 20 by the proximity sensor 22, i.e., to determine whether the marker 20 is or is not detected by the proximity sensor 22. As described below, the marker 20 is positioned to be detected by the proximity sensor 22 or not detected by the proximity sensor 22 based on the size of the occupant in the rear seat 12.

The proximity sensor 22 is fixed relative to the seatbelt retractor 18. Specifically, the webbing 14 moves relative to the proximity sensor 22 when the webbing 14 is paid out of or retracted into the seatbelt retractor 18. The proximity sensor 22 is a contactless sensor. The proximity sensor 22 may include a sensing element, a signal processing, and an output. The proximity sensor 22 may detect the presence of the marker 20 without any physical contact. Additionally, the proximity sensor 22 may detect the size, shape, material or other characteristics of the marker 20. A range in which the proximity sensor 22 may detect the marker 20 is called the detection field.

As one example, the proximity sensor 22 may be an inductive sensor. The inductive sensor may emit an electromagnetic field and may sense changes in the electromagnetic field induced by the marker 20. In this instance, for example, the marker 20 may be formed of electrically conductive material. For example, the markers 20 may be formed of copper, iron, or any other electrically conductive material. As an example, the inductive sensor may be a Hall-effect sensor.

As another example, the proximity sensor 22 may be a capacitive sensor. The capacitive sensor may rely on differences in dielectric characteristics of the webbing 14 versus the marker 20.

As another example, the proximity sensor 22 may be an optoelectronic sensor. The optoelectronic proximity sensor 22 senses the absence or presence of the marker 20 by using a light transmitter, e.g., laser or infrared, and a photoelectric receiver. The photoelectric receiver may detect the marker 20 by sensing a change in the light as the marker 20 pass the photoelectric receiver between the light transmitter and the photoelectric receiver. Alternatively, the light transmitter may be adjacent the photoelectric receiver. In this configuration, the light transmitter may emit the light toward the webbing 14 and the light is reflected as a reflected beam back to the photoelectric receiver. The photoelectric receiver may detect the marker 20 by changes in characteristics of the reflected beam, e.g., the reflective intensity or a wave length of the reflected light from the markers 20 may be different from the reflective intensity or the wave length of the light reflected from the webbing 14.

The marker 20 is fixed to the webbing 14 and is detectable by the proximity sensor 22 when in sensing range. As shown in the Figures, the marker 20 is embedded in the webbing 14, e.g., the marker 20 may be sewn or woven into the webbing 14. The marker 20 may be, for example, a flexible magnetic strip. In this example, the magnetic strip may be between 0.3 mm and 0.6 mm thick. The magnetic strip may be of any suitable dimensions for the webbing 14. The magnetic strip may be a continuous metallic strip or may be a flexible magnetic webbing 14.

The marker 20 has a marker first end 78 and a marker second end 80 on the axis A. The marker 20 may be elongated along the axis A between the marker first end 78 and the marker second end 80. The marker first end 78 is positioned between the marker second end 80 and the webbing second end 56. In other words, when the webbing 14 is paid from the seatbelt retractor 18, the marker first end 78 is payed from the seatbelt retractor 18 before the marker second end 80.

The webbing 14 is payable from the retractor across the rear seat 12. When the webbing 14 is paid from the retractor, the webbing 14 moves within the sensing range of the proximity sensor 22. Thus, when the portion of the webbing 14 including the marker 20 is paid from the seatbelt retractor 18, the marker 20 is detected by the proximity sensor 22.

The seatbelt retractor 18 is controlled based on the detection of the marker 20 or the lack of detection of the marker 20 by the proximity sensor 22. Specifically, The marker 20 is positioned along the axis A of the webbing 14 to be in sensing range of the proximity sensor 22, i.e., to be detected by the proximity sensor 22, when a relative large occupant is on the rear seat 12, e.g., a child seat 24 (in a rearward facing position or a forward facing position), a 50th percentile male ATD, or a 95-percentile male ATD. The marker 20 is positioned along the axis A of the webbing 14 to be outside the sensing range of the proximity sensor 22, i.e., to not be detected by the proximity sensor 22, when a relatively small occupant is in the rear seat 12, e.g., a 5th-percentile female ATD, a 6-year old ATD, or a 10-year old ATD.

When the occupant of the rear seat 12 is a 5th-percentile female ATD, a portion 88 of webbing 14 between the first end 52 of the marker 20 and the second end 56 of the webbing 14 is paid across the rear seat 12 from the seatbelt retractor 18. Said differently, the marker 20 does not extend along portion 88. The kinematics of the occupant are controlled by the webbing 14 when the clip 48 is engaged with the seatbelt buckle 46. When the clip 48 is engaged with the seatbelt buckle 46 for a 5th-percentile female ATD on the rear seat 12, the portion 88 of webbing 14 between the first end 52 of the marker 20 and the second end 56 of the webbing 14 is positioned to be in the sensing range of the proximity sensor 22. In other words, the marker 20 is outside of the sensing range of the proximity sensor 22 when the webbing 14 is engaged with a 5th-percentile female ATD on the rear seat 12.

As another example, the marker 20 is positioned along the webbing 14 to be out of sensing range of the proximity sensor 22 when the occupant of the rear seat 12 is a 6-year old ATD or a 10-year old ATD. In other words, the marker 20 is inside the seatbelt retractor 18 when the webbing 14 is engaged with a 6-year old ATD or a 10-year old ATD.

When a child seat 24 is installed in the rear seat 12, the kinematics of the child seat 24 are controlled by the webbing 14 when the clip 48 is engaged with the seatbelt buckle 46. When the clip 48 is engaged with the seatbelt buckle 46 with the child seat 24 on the rear seat 12, the marker 20 is in the sensing range of the proximity sensor 22. As an example shown in the Figures, the marker second end 80 may be positioned along the axis A to be in the sensing range of the proximity sensor 22 when the webbing 14 is engaged with a rear-facing child seat 24 on the rear seat 12. As another example shown in the Figures, a portion of the marker 20 between the first end 52 and the second end 56 of the marker 20 may be positioned along the axis to be in sensing range of the proximity sensor 22 when the webbing 14 is engaged with a front-facing child seat 24 on the rear seat 12.

As another example, the marker 20 is positioned along the webbing 14 to be in sensing range of the proximity sensor 22 when the webbing 14 is engaged with the 50th-percentile male ATD and when the webbing 14 is engaged with the 95th-percentile male ATD. Specifically, the marker 20 is positioned along the webbing 14 to be in the sensing range of the proximity sensor 22 when the webbing 14 is engaged with the 50th-percentile male ATD or the 95th-percentile male ATD on the rear seat 12.

The marker first end 78 may be positioned along the axis A to be in the sensing range of the proximity sensor 22 when the webbing 14 is engaged with the 50th-percentile male ATD on the rear seat 12. The marker second end 80 may be positioned along the axis A to be in the sensing range of the proximity sensor 22 when the webbing 14 is engaged with a child seat 24 on the rear seat 12.

As shown in the Figures, the occupant and/or the child seat 24 is placed on the seat. The system is moved from the unfastened position to the fastened position. The webbing 14 is paid from the seatbelt retractor 18 across the rear seat 12, in the example when the occupant is on the seat, or through the webbing passthrough 42 of the shell 38, in the example when the child seat 24 is placed on the rear seat 12. The webbing 14 is in the sensing range of the proximity sensor 22. When the proximity sensor 22 does not detect the marker 20, e.g., when the occupant is the 5th-percentile female ATD, 6-year Old Child ATD, 10-year Old Child ATD, etc., the retractor operates in the low load mode. When the proximity sensor 22 detects the marker 20, e.g., when the occupant is the 50th-percentile male ATD, the child seat 24 installed in the forward-facing direction or the rearward-facing direction, the 95th-percentile male ATD, etc., the retractor operates in the high load mode.

The invention claimed is:
1. A vehicle comprising:
a rear seat;
a seatbelt retractor;
a webbing retractably extendable across the rear seat from the seatbelt retractor;
a marker fixed to the webbing;

a proximity sensor fixed relative to the seatbelt retractor, the proximity sensor being designed to detect the marker when the marker is within sensing range of the proximity sensor;

the marker being positioned along the webbing to be out of sensing range of the proximity sensor when the webbing is engaged with a 6-year-old anthropomorphic test device seated on the rear seat and to be in sensing range of the proximity sensor when the webbing is engaged with a child seat on the rear seat; and a computer having a processor and a memory storing instructions executable by the processor to operate the seatbelt retractor in a high-load mode when the marker is detected by the proximity sensor and to operate the seatbelt retractor in a low-load mode in the absence of detection of the marker by the proximity sensor.

2. The system as set forth in claim 1, wherein the marker is positioned along the webbing to be in sensing range of the proximity sensor when the webbing is engaged with a 50th percentile male anthropomorphic test device on the rear seat.

3. The system as set forth in claim 1, wherein the webbing is elongated along an axis, the marker having a first end and a second end on the axis and being elongated along the axis between the first end and the second end, the first end of the marker being positioned along the axis to be in sensing range of the proximity sensor when the webbing is engaged with a 50th percentile male anthropomorphic test device on the rear seat and the second end of the marker being positioned along the axis to be in sensing range of the proximity sensor when the webbing is engaged with a child seat on the rear seat.

4. The system as set forth in claim 3, wherein the webbing has a first end in the retractor and a second end spaced from the retractor and fixed relative to the rear seat, the second end of the marker being between the first end of the marker and the second end of the webbing.

5. The system as set forth in claim 4, wherein a portion of the webbing between the first end of the marker and the second end of the webbing is positioned to be in sensing range of the proximity sensor when the webbing is engaged with a 6-year-old anthropomorphic test device on the rear seat.

6. The system as set forth in claim 3, wherein the second end of the marker is positioned along the axis to be in sensing range of the proximity sensor when the webbing is engaged with a rear-facing child seat on the rear seat.

7. The system as set forth in claim 6, wherein a portion of the marker between the first end and the second end of the marker is positioned along the axis to be in sensing range of the proximity sensor when the webbing is engaged with a front-facing child seat on the rear seat.

8. The system as set forth in claim 1, wherein:
the marker is positioned along the webbing to be out of sensing range of the proximity sensor when the webbing is engaged with a 10-year-old anthropomorphic test device and when the webbing is engaged with a 5th-percentile female anthropomorphic test device; and
the marker is positioned along the webbing to be in sensing range of the proximity sensor when the webbing is engaged with a 50th-percentile male anthropomorphic test device and when the webbing is engaged with a 95th-percentile male anthropomorphic test device.

9. The system as set forth in claim 1, further comprising a clip slidably engaged with the webbing along the axis and a seatbelt buckle fixed relative to the rear seat and releasably engageable with the clip, the clip being engaged with the seatbelt buckle when the webbing is engaged with a 6-year-old anthropomorphic test device and when the webbing is engaged with a child seat.

10. The system as set forth in claim 1, wherein the marker is inside the retractor when the webbing is engaged with a 6-year-old anthropomorphic test device on the rear seat and the marker is outside of the retractor when the webbing is engaged with a child seat on the rear seat.

11. A system comprising:
a seatbelt retractor;
a webbing retractably extendable from the seatbelt retractor;
a marker fixed to the webbing;
a proximity sensor fixed relative to the seatbelt retractor, the proximity sensor being designed to detect the marker when the marker is within sensing range of the proximity sensor;
the marker being positioned along the webbing to be out of sensing range of the proximity sensor when the webbing is engaged with a 6-year-old anthropomorphic test device and to be in sensing range of the proximity sensor when the webbing is engaged with a child seat; and
a computer having a processor and a memory storing instructions executable by the processor to operate the seatbelt retractor in a high-load mode when the marker is detected by the proximity sensor and to operate the seatbelt retractor in a low-load mode in the absence of detection of the marker by the proximity sensor.

12. The system as set forth in claim 11, wherein the marker is positioned along the webbing to be in sensing range of the proximity sensor when the webbing is engaged with a 50th percentile male anthropomorphic test device.

13. The system as set forth in claim 11, wherein the webbing is elongated along an axis, the marker having a first end and a second end on the axis and being elongated along the axis between the first end and the second end, the first end of the marker being positioned along the axis to be in sensing range of the proximity sensor when the webbing is engaged with a 50th-percentile male anthropomorphic test device and the second end of the marker being positioned along the axis to be in sensing range of the proximity sensor when the webbing is engaged with a child seat.

14. The system as set forth in claim 13, wherein the webbing has a first end in the retractor and a second end spaced from the retractor, the second end of the marker being between the first end of the marker and the second end of the webbing.

15. The system as set forth in claim 14, wherein a portion of the webbing between the first end of the marker and the second end of the webbing is positioned to be in sensing range of the proximity sensor when the webbing is engaged with a 6-year-old anthropomorphic test device.

16. The system as set forth in claim 13, wherein the second end of the marker is positioned along the axis to be in sensing range of the proximity sensor when the webbing is engaged with a rear-facing child seat.

17. The system as set forth in claim 16, wherein a portion of the marker between the first end and the second end of the marker is positioned along the axis to be in sensing range of the proximity sensor when the webbing is engaged with a front-facing child seat.

18. The system as set forth in claim 11, further comprising a clip slidably engaged with the webbing along the axis and a seatbelt buckle releasably engageable with the clip, the clip being engaged with the seatbelt buckle when the webbing is engaged with a 6-year-old anthropomorphic test device and when the webbing is engaged with a child seat.

19. A system comprising:
a seatbelt retractor;
a webbing payable from the seatbelt retractor;
a marker fixed to the webbing;
a proximity sensor fixed relative to the seatbelt retractor, the proximity sensor being designed to detect the marker when the marker is within sensing range of the proximity sensor; the marker being positioned along the webbing to be out of sensing range of the proximity sensor when the webbing is engaged with a 6-year-old anthropomorphic test device and to be in sensing range of the proximity sensor when the webbing is engaged with a child seat; and
wherein the webbing is elongated along an axis, the marker having a first end and a second end on the axis and being elongated along the axis between the first end and the second end, the first end of the marker being positioned along the axis to be in sensing range of the proximity sensor when the webbing is engaged with a 50th-percentile male anthropomorphic test device and the second end of the marker being positioned along the axis to be in sensing range of the proximity sensor when the webbing is engaged with a child seat.

* * * * *